(12) United States Patent
Theobald

(10) Patent No.: US 9,393,857 B1
(45) Date of Patent: Jul. 19, 2016

(54) VEHICLE AND OPERATING METHOD

(71) Applicant: Daniel Theobald, Somerville, MA (US)

(72) Inventor: Daniel Theobald, Somerville, MA (US)

( * ) Notice: Subject to any disclaimer, the term of this patent is extended or adjusted under 35 U.S.C. 154(b) by 0 days.

(21) Appl. No.: 14/554,178

(22) Filed: Nov. 26, 2014

(51) Int. Cl.
*B60K 16/00* (2006.01)
*B60K 1/04* (2006.01)

(52) U.S. Cl.
CPC . *B60K 1/04* (2013.01); *B60K 16/00* (2013.01); *B60K 2001/0444* (2013.01); *B60K 2016/003* (2013.01)

(58) Field of Classification Search
CPC . Y02T 90/14; Y02T 10/7005; B60L 11/1864; B60L 2230/22; B60L 2230/30
See application file for complete search history.

(56) References Cited

U.S. PATENT DOCUMENTS

| | | | | |
|---|---|---|---|---|
| 7,520,355 B2* | 4/2009 | Chaney | ............ | B60K 1/04 180/68.5 |
| 2010/0109601 A1* | 5/2010 | Coyle | ............ | B60L 8/003 320/102 |
| 2010/0141201 A1* | 6/2010 | Littrell | ............ | H02J 7/35 320/101 |
| 2010/0193261 A1* | 8/2010 | Freeman | ............ | B60K 16/00 180/2.2 |
| 2011/0181018 A1* | 7/2011 | Bruneau | ............ | B60P 3/10 280/414.1 |
| 2011/0320078 A1* | 12/2011 | McGill | ............ | B60K 6/48 701/22 |
| 2012/0299527 A1* | 11/2012 | Vo | ............ | B60L 3/0046 320/101 |
| 2013/0231808 A1* | 9/2013 | Flath | ............ | B60W 10/30 701/22 |

* cited by examiner

*Primary Examiner* — Brodie Follman
*Assistant Examiner* — Hilary L Johns
(74) *Attorney, Agent, or Firm* — Albert J. Brunett

(57) ABSTRACT

A vehicle and method of operating a vehicle are provided. The method includes providing a vehicle and at least one drive element in operable communication with the vehicle for providing movement to the vehicle. A plurality of power sources are also provided for providing power to the drive element along with at least one power source securing member for releasably securing a desired number of power sources to the vehicle. The method further includes connecting a desired number of power sources to the vehicle via the securing member to provide power to the drive element, each power source being readily removable from the vehicle so that only the desired number of power sources are used for a particular vehicle use to minimize the weight and therefore power consumption of the vehicle.

12 Claims, 5 Drawing Sheets

VEHICLE AND OPERATING METHOD

BACKGROUND OF THE INVENTION

1. Field of the Invention

The present invention generally relates to vehicles and methods of operating vehicles.

2. Background Information

Vehicles such as automobiles or the like may include multiple numbers of power sources to operate. Often times, however, these vehicles may have more power sources than necessary, which may increase power consumption due to extra weight, or the vehicle may not have enough power sources.

SUMMARY OF THE INVENTION

A vehicle and method of operating a vehicle are provided. The method includes providing a vehicle and at least one drive element in operable communication with the vehicle for providing movement to the vehicle. A plurality of power sources are also provided for providing power to the drive element along with at least one power source securing member for releasably securing a desired number of power sources to the vehicle. The method further includes connecting a desired number of power sources to the vehicle via the securing member to provide power to the drive element, where each power source is readily removable from the vehicle so that only the desired number of power sources are used for a particular vehicle use to minimize the weight and therefore power consumption of the vehicle.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

Figure 1:
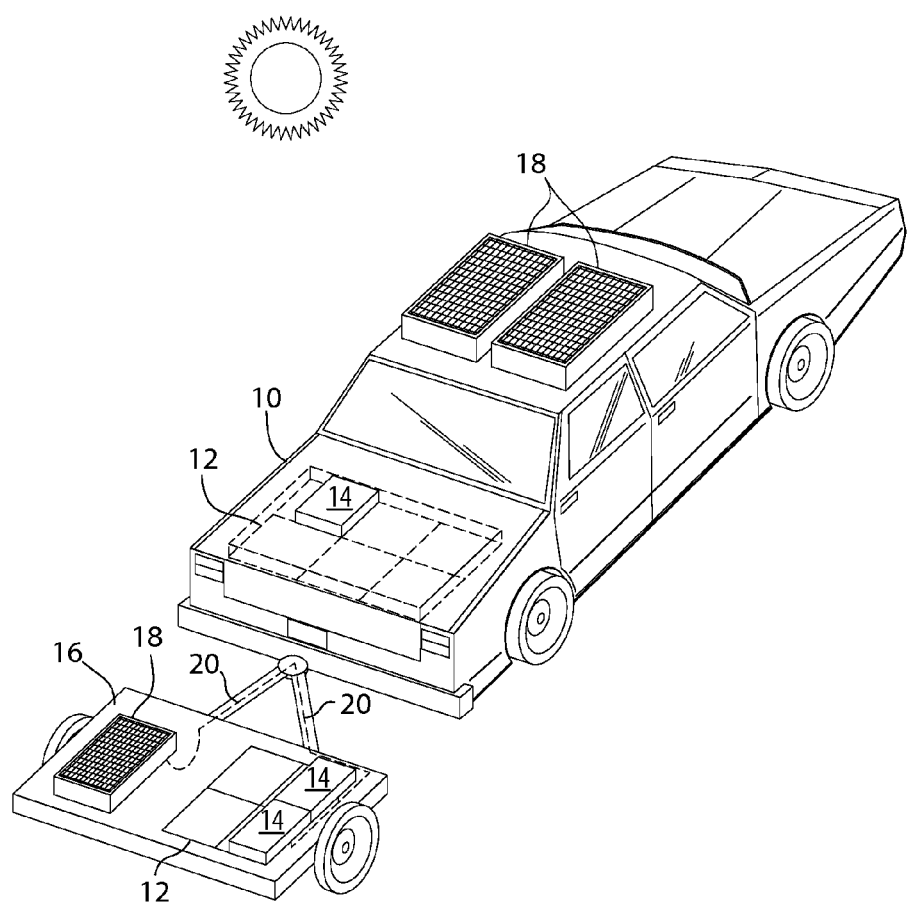
FIG. 1 generally illustrates a vehicle with power sources in accordance with one embodiment of the invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention is generally related to a vehicle and method of operating a vehicle. In the context of this invention, the term "vehicle" may refer to an autonomous, semi-autonomous or non-autonomous car, van, truck, boat, motorcycle, scooter, trailer, train, robot, plane, drone, aerial vehicle, submersible vehicle or any other type of vehicle.

For example, the vehicle may be an electric vehicle powered by a plurality of power sources such as batteries. Other types of vehicles may also be included such as, for example, a gasoline hybrid vehicle, a propane vehicle or a fuel cell vehicle or the like. It is to be understood, however, that the invention is not to be limited by the type of power used to provide movement or other type of power to the vehicle.

If the vehicle is an electric vehicle, for example, the vehicle may have an adjustable battery capacity (i.e., the number of batteries used to supply power to the vehicle). The ability to adjust the number of batteries used may lead to significant advantages relating to vehicle range (the distance the vehicle is able to travel) and vehicle power consumption, among other advantages.

Regarding the vehicle's range, for example, the vehicle may require only a certain number of batteries to travel to a certain destination. To travel to destinations at greater distances, however, the vehicle may need several more batteries to supply the required power. Adjusting the number of batteries used may therefore easily increase the vehicle's range as needed.

Similarly, by having the vehicle carry, tow, or otherwise travel with multiple batteries, there is more weight acting on the vehicle, which may increase the vehicle's power consumption. In accordance with the features of the invention, the vehicle may use only the number of batteries required to travel to the vehicle's destination(s). This inevitably decreases the weight the vehicle must transport and therefore the vehicle's power consumption.

Another advantage of the present invention is that multiple batteries can be used to supply power to the vehicle simultaneously, rather than a single battery. Therefore, an operator doesn't need to substitute a "dead" battery as often.

These features may overcome the disadvantages of existing electric vehicles. Existing electric vehicles, for example, may be considered unreliable as they do not allow for significant travel ranges. Additionally, there may be only a small number of available public charging stations (compared to the number of gas stations, for example), and it may take several hours for existing electric vehicles to obtain a full charge.

The features of the invention may be advantageous in any application in which vehicles such as those mentioned above need to travel to and from various locations. For example, commercial trucking or delivery vehicles including robots or the like may implement the features of the invention to ensure they are able to travel to their destination(s) and in an efficient manner. Similarly, personal vehicles may also use the features of the present invention.

The vehicle in accordance with the invention may also be at least partially powered by gasoline. In this embodiment, the vehicle may switch to run on gasoline if the battery or batteries are running low on charge or fully discharge. Similarly, the amount of gasoline the vehicle has or can have (i.e., gas storage capacity) may also be a factor in determining a desired number of batteries to use.

The features of the invention may also help save on energy costs and reduce one's carbon footprint. For example, an operator may need only one battery to travel to work, but may need two batteries in order to return home from work. Rather than using two of the operator's own batteries (which may increase personal costs and also increase power consumption as the vehicle is required to transport more weight), the operator may only use one battery and charge the battery at work (if possible) and then return home with a charged battery.

FIG. 1 generally illustrates a vehicle 10 in accordance with one embodiment of the invention. As can generally be seen, the vehicle 10 may include a power source securing member 12 (e.g., positioned in a receiving area such as the trunk, roof, seats, or other portions of the vehicle 10) capable of receiving at least one power source 14, illustrated as a battery device (hereinafter "battery" or "batteries").

The vehicle 10 may also be configured with a trailer 16. Both the vehicle 10 and the trailer 16 may include batteries 14, solar panels 18, and include any appropriate electrical connections 20 to supply power to the vehicle 10.

Briefly, in operation, a computing device (not shown in FIG. 1) or an operator may determine a desired number of batteries 14 to be connected to the securing member 12. The desired number of batteries 14 may be based on the distance to the destination(s), as well as other vehicle power consumption factors. An operator may then attach or remove the appropriate number of batteries 14 to provide power to at least one drive element (discussed below) that supplies power or movement to the vehicle 10.

The vehicle 10 may be any type of vehicle such as those mentioned previously, and may include at least one securing member 12 positioned in a receiving area to receive or otherwise secure the batteries 14. The securing member 12 may be of any configuration or design as long as it enables the ready attachment and removal of the batteries 14 and enables appropriate connectivity between the batteries 14 and at least one drive element (such as a motor) of the vehicle 10.

The securing member 12 may, in combination with batteries 14, be configured with "quick connector" devices to facilitate the ready attachment and removal of the batteries 14, including quick connector devices that do not require any tools. For example, the batteries 14 may be attached via various types of spring-lock mechanisms, latches, rails, straps, or any other type of connector device whether available now or invented hereafter. The type of connector device may vary as long as the batteries 14 can be readily attached and removed preferably without any tools, and provide the appropriate electrical connectivity to the drive element(s) of the vehicle.

Figure 2:
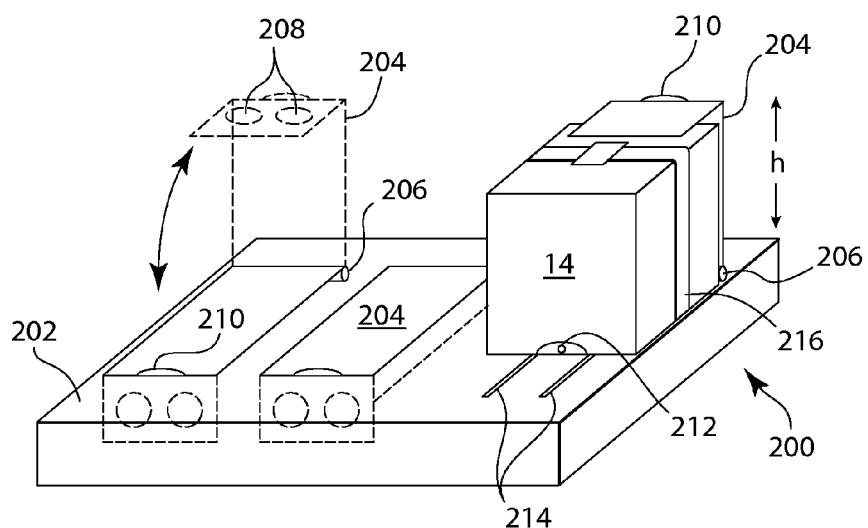
FIG. 2 generally illustrates a perspective view of a securing member in accordance with one embodiment of the invention.

FIG. 2 generally illustrates a perspective view of a power source securing member 200 in accordance with one embodiment of the invention. The securing member 200 in this embodiment may be positioned on, in, or otherwise with a receiving area of a vehicle or a trailer as illustrated in FIG. 1. The securing member 200 may include a support surface 202 and plurality of cover portions 204 operably attached to the support surface 202 via hinge devices 206 or the like.

The cover portions 204 may be spring-loaded and configured to be in a "down" position when not connected to a battery 14. Having the cover portions 204 in this down position may protect the electrical connector devices 208 from being damaged due to contact and exposure to items such as, dirt, dust, insects, rain, wind, snow, or other elements depending on the placement of the securing member 200. Although only three cover portions 204 are illustrated, the number of cover portions 204 may of course vary.

When an operator wants to attach a battery 14 to the securing member 200, the operator may lift an available cover portion 204 via a handle 210 to be in a "raised" position. The cover portions 204 may be configured to lock or otherwise remain in the raised position. The height h of the cover portion 204 (i.e., and therefore the height of the electrical connector devices 208) from the support surface 202 may also be adjusted to more easily accommodate batteries 14.

Once the cover portion 204 is in the raised position, the electrical connector devices 208 are essentially exposed and able to receive or otherwise connect with electrodes (not shown) of a battery 14. The operator may then position a battery 14 on the securing member 200 to establish connectivity between the battery's electrodes and the electrical connector devices 208. Appropriate connections may also be included to establish connectivity between the batteries 14 and at least one drive element (such as a motor) of the vehicle.

It is of course desirable for the batteries 14 to be secured to prevent unwanted movement (e.g., due to vehicle acceleration, deceleration, collision, inclination, and other vehicle movement or the like). The securing member 200 may therefore include thumbscrews 212, sliding rails 214, straps 216, receptacles or the like to receive and secure the batteries 14 in addition to the quick connector devices described above.

Figure 3:
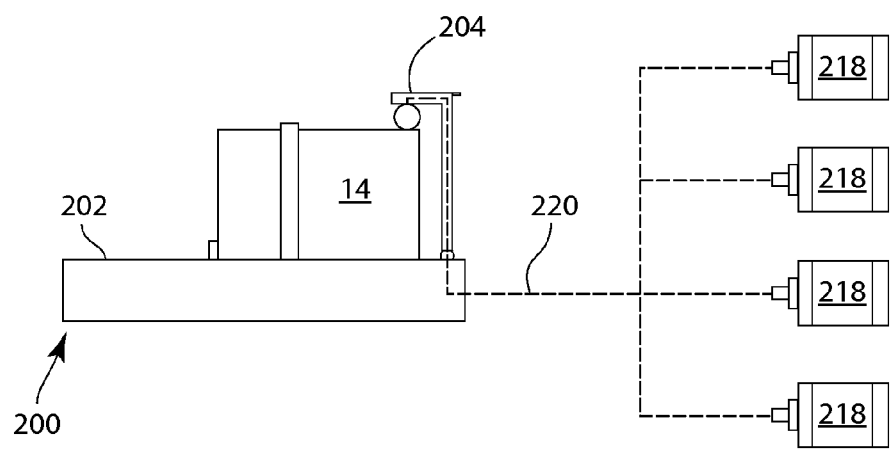
FIG. 3 generally illustrates a side view of a securing member in accordance with one embodiment of the invention.

FIG. 3 generally illustrates a side view of the power source securing member 200 of FIG. 2. As can readily be seen, the battery 14 is in operable communication with a plurality of drive elements 218 such as motors or the like via electrical connections 220. Although only one battery 14 is illustrated, additional batteries 14 may also be secured by the securing member 200 and provide power to the drive elements 218.

Although four drive elements 218 are illustrated, the number of drive elements 218 used to supply power to the vehicle to at least enable movement of the vehicle may of course vary. For example, each wheel of an automobile may be powered by its own drive element 218.

Referring back to FIG. 1, the batteries 14 may be positioned on or otherwise with the vehicle 10, and/or may also be located on a portion of a trailer 16 that is connected with the vehicle 10. The exact configuration or placement of the batteries 14 may vary without departing from the features of the invention, and the appropriate connections 20 may be included to supply power from the batteries 14 to the vehicle 10 as necessary.

In the embodiment generally illustrated in FIG. 1, the vehicle 10 may also include one or more solar panels 18 to gather and supply power to the vehicle 10. These solar panels 18 may be positioned on a portion of the vehicle 10 and/or on a portion of the trailer 16. These solar panels 18 may gather and supply power as the vehicle 10 is traveling to the destination(s) and/or when the vehicle 10 is stationary.

Accordingly, in this embodiment, another vehicle power consumption factor is the amount of power that can be gathered/supplied by the solar panels 18. This may depend on cloud coverage, tunnels, overpassing bridges, trees, or the like. Essentially, the number of batteries 14 desired or required may depend on the amount of power that is anticipated to be gathered/supplied by the solar panels 18.

Other vehicle power consumption factors may include factors relating to the internal operation of the vehicle 10 such as vehicle cargo weight (including the weight of the batteries), on-board entertainment systems (radio/TV) and their operating volume, windshield wipers, headlights, heaters, air conditioners, tire pressure, turn signals, brake lights, or the like. All of these factors, along with others, may tend to affect the vehicle's power consumption.

Another factor that may affect the power consumption of the vehicle 10 is the terrain of the environment. For example, traveling up hills may require more power than traveling on level terrain, while traveling downhill may consume less power as the vehicle 10 can coast. More specifically, the length and inclination of the hill may also affect the vehicle's power consumption.

Weather is another factor that may affect the vehicle's power consumption. For example, if there is precipitation, the vehicle 10 may need to travel more slowly which will tend to increase power consumption as the vehicle 10 will take longer to reach the destination(s). Additionally, precipitation may cause other vehicle components to increase consumption as well, such as windshield wipers, headlights, brake lights, or the like.

Another factor that may affect the vehicle's power consumption is traffic. Traffic along potential routes to a destination may cause the vehicle to be running for a longer period of time and therefore consume more power.

Similarly, the amount of traffic lights and stop signs along a particular route to a destination may cause the vehicle 10 to be running for a longer period of time as well. Additionally, repeatedly accelerating and decelerating may further increase the vehicle's power consumption.

It is of course noted that certain factors may directly affect other factors. For example, if the vehicle 10 is in traffic, it is expected that there will be a significant amount of "stop-and-go," therefore leading to increased acceleration/deceleration and brake light operation. Or, if the vehicle is driving in the rain, it is expected that the headlights will be on and that the windshield wipers will be operating.

Figure 4:
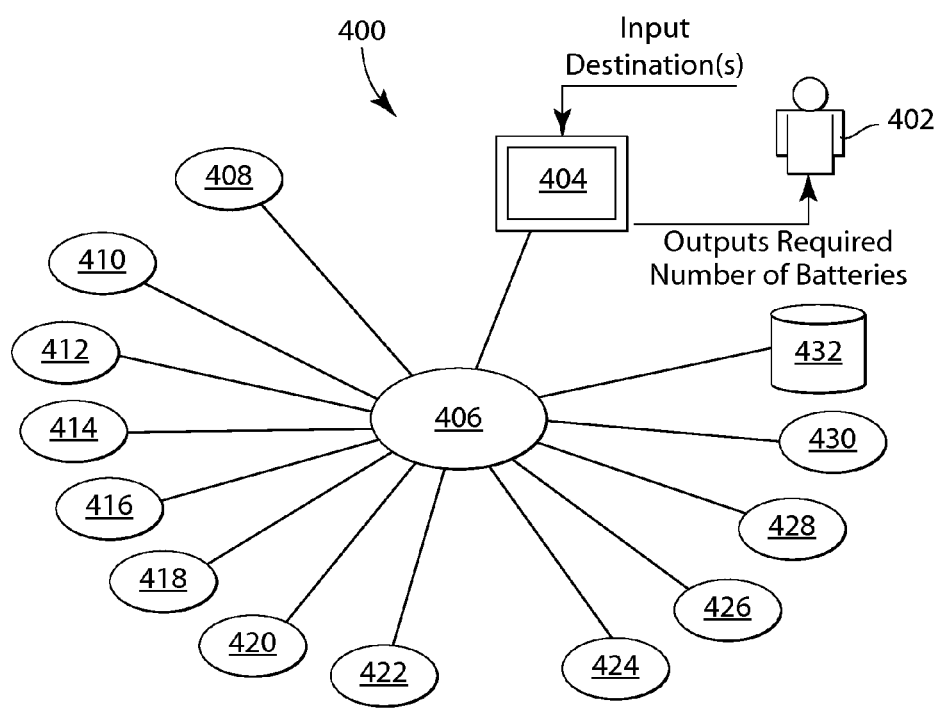
FIG. 4 generally illustrates a diagram of components in accordance with the one embodiment of the invention.

FIG. 4 generally illustrates a diagram 400 of various components/factors in accordance with one embodiment of the invention. This diagram 400 is merely exemplary and the number of and type of components and factors considered may vary.

In this embodiment, an operator 402 may input a desired destination (or more than one destination) via a user interface 404. The operator 402 may, for example, input an address of a destination or several destinations.

The user interface 404 may receive this type of information as well as output information to the operator 402 such as the number of batteries required to ensure the vehicle can travel to the destination(s). The user interface 404 may be a touch screen display or enable any other type of communication with the operator 402. It is course noted that a user interface 404 and a computing device 406 may not even be necessary, as the operator 402 can decide on their own how many batteries are desired.

The user interface 404 may also allow for the operator 402 to interact with a virtual map of the desired environment and to input any additional information (e.g., temporal constraints of a desired trip). Similarly, the user interface 404 may output specific information regarding the vehicle power consumption factors and how they affect power consumption.

The user interface 404 may be in communication with a computing device 406, which may be implemented using a combination of hardware and software. The hardware may include memory and a processing device, which may include one or more single-core and/or multi-core processors. The computing device 406 may be any type of device as long as it can receive and analyze the information about the vehicle power consumption factors and to determine the number of batteries required.

The computing device 406 may receive information regarding the vehicle power consumption factors 408-430, and be in communication with a historical database 432. Information regarding the vehicle power consumption factors may be gathered both before and during the trip. These factors may be similar to those discussed in applicant's previously filed application Ser. No. 14/319,069 entitled "Power Consumption Evaluation Method" filed on Jun. 30, 2014, the content of which is hereby incorporated by reference.

The computing device 406 may consider factors such as the characteristics of batteries 408 and their effect on vehicle power consumption. For example, the computing device 406 may consider the power level of the batteries, the weight of individual batteries or, depending on their placement, the amount of drag the batteries produce as the vehicle is traveling.

Although more power may be available with more batteries, there will be more weight acting on the vehicle which increases power consumption. An operator or the computing device 406 may essentially determine an optimal number of batteries to be used considering this tradeoff. For example, if only two batteries are required to complete a given trip, there may be no reason to include more than two batteries (unless just as a back-up) as the extra batteries would only supply unnecessary power and cause the vehicle to carry more weight.

Other components/factors relating to the operation and power consumption of the vehicle include any on-board entertainment systems 410 (radio/TV, and their volume), headlights 412, windshield wipers 414, cargo weight 416, brake lights 418, turn signals 420, and tire pressure 422. This list of factors is merely exemplary and it is expressly contemplated that other factors relating to the operation of the vehicle and how they affect power consumption may be determined.

The computing device 406 may also gather information regarding external factors 424, 426, 428, and 430. These factors may include, for example, terrain (including distances) 424, weather 426, traffic 428, and locations of power restoration stations 430 (e.g., charging stations).

Information regarding the terrain 424 may include the physical characteristics of the environment such as hills (and their angle of inclination/declination, length, or the like). This type of information may be obtained from previously conducted environmental analyses by the operator 402 or by some other entity that makes this information available to the computing device 406. Similarly, the operator 402 may input any relevant environmental factors they are aware of via the user interface 404.

Information regarding the weather 426 may include temperature, precipitation (rain, snow, or the like), wind patterns, and the amount of sunlight along various potential routes to a destination (if the vehicle includes solar panels). This information may be obtained via various sensor devices positioned throughout the environment or may be communicated to the computing device 306 in real time from weather service entities.

Information regarding the traffic 428 may be obtained from various sensor devices located throughout the environment. Or, information regarding traffic may be communicated to the computing device 406 in real time from traffic news entities and from other vehicles in the environment.

Information regarding power restoration stations 430 may be inputted by the operator 402 if they are generally knowledgeable of the environment. Or, this information may be previously gathered by some other entity and made available to the computing device 406.

The historical database 432 may also provide information to the computing device 406 (e.g., if the computing device 406 is unable to obtain information regarding the vehicle power consumption factors in real time). This information may include the driving patterns of the driver such as how quickly they typically accelerate/decelerate their vehicle or at what volume they typically listen to the radio. Similarly, the historical database 432 may provide insight on traffic patterns based on time of day, day of week, or where and when there is generally the most amount of sunlight.

Figure 5:
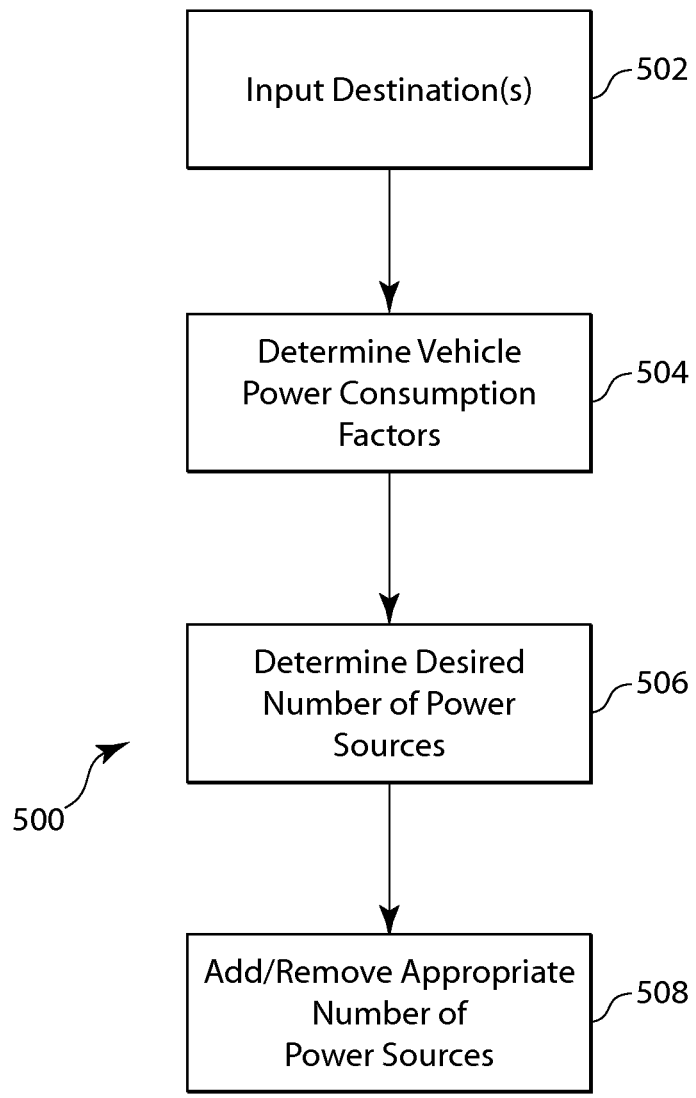
FIG. 5 generally illustrates a flow chart of a method of operating a vehicle in accordance with one embodiment of the invention.

FIG. 5 generally illustrates a method 500 of operating a vehicle in accordance with one embodiment of the invention. In step 502, an operator (such as a driver or passenger) of the vehicle may input one or more destinations via a user interface 404, if applicable.

For example, a driver may input the address of their place of employment, intermittent stops, and also their home address, essentially indicating a round-trip. Similarly, the computing device 406 may assume the driver plans on returning to their original location and evaluate the vehicle power consumption factors accordingly.

In step 504, the computing device 406, if applicable, may determine and evaluate the vehicle power consumption factors, such as the distance of the overall round-trip. The factors evaluated may include at least those mentioned previously.

Based on the vehicle power consumption factors and their anticipatory effect on power consumption, in step 506 the computing device 406 may determine the number of batteries required to ensure the vehicle is able to travel to the destination(s). The computing device 406 may of course consider the type (size, power output, weight) of the batteries that can be used by the vehicle in making this determination. The computing device 406 may then, via a user interface, output the required number of batteries to an operator.

In step 508, the driver (or any other entity such as another person or a robot) may then add or remove the appropriate number of batteries to the vehicle (and/or a trailer). These batteries may be readily attachable/removable as discussed previously. The driver or some other entity may then store any unused batteries in a location such as a garage and/or may plug them into a power source to ensure they are charged for later use.

As stated previously, a computing device may not even be necessary to determine the desired (or required) number of batteries. For example, an operator may attach/remove a certain number of batteries based on personal preference or if they already have an idea of how many batteries they'll want to use for a given trip.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A vehicular system, comprising:
a vehicle comprising a drive system, a power system, a power source receiving area and an electronic system;
the drive system including an electric motor, the drive system configured to move the vehicle;
the power system including an electrical component and a quantity of discrete power source modules, the power system configured to power the drive system during at least a first mode and a second mode, the power system operable to power the drive system using the quantity of the power source modules during the first mode, and the power system operable to power the drive system using a subset of the quantity of the power source modules during the second mode;
the power source receiving area configured to receive the quantity of power source modules;
the power source securing member including a plurality of power source coupling devices positioned within the power source receiving area, a first of the power source coupling devices configured to releaseably secure a first of the power source modules to the vehicle and electrically coupled the first of the power source modules to the electrical component, and a second of the power source coupling devices configured to releaseably secure a second of the power source modules to the vehicle and electrically coupled the second of the power source modules to the electrical component; and
the electronic system including a computing device and a user interface, the computing device configured to determine a vehicle power consumption factor and provide a recommendation based on the determined vehicle power consumption factor, and the user interface configured to present the recommendation to an individual;
wherein the recommendation communicates to the individual a recommended number of the power source modules to be configured with the vehicle, the recommended number of the power source modules is equal to the quantity of the power source modules during the first mode, and the recommended number of the power source modules is equal to the subset of the quantity of the power source modules during the second mode.

2. The vehicular system of claim 1, wherein the vehicle power consumption factor is determined based on a distance to at least one destination of the vehicle.

3. The vehicular system of claim 1, wherein the vehicle power consumption factor is determined based on at least one of a vehicle cargo weight, operation of an on-board vehicle entertainment system, weight of the power source modules, operation of a vehicle air conditioner, operation of a vehicle heater, operation of vehicle brake lights, tire pressure, operation of headlights, weather, traffic and/or terrain.

4. The vehicular system of claim 1, wherein each of the power source coupling devices is further configured to enable a respective one of the power source modules to be discretely coupled with and/or decoupled from that power source coupling device without requiring decoupling of another one of the power source coupling devices from another one of the power source modules.

5. The vehicular system of claim 1, wherein each of the power source modules comprises a battery.

6. The vehicular system of claim 1, further comprising a solar panel in operable communication with the vehicle to gather and supply an additional amount of power to the drive system when the vehicle is moving, stopped and/or parked.

7. The vehicular system of claim 1, wherein the first of the power source coupling devices includes, in combination with the first of the power source modules, a quick connector device so that the first of the power source modules is operable to be readily attached to and removed from the vehicle without requiring tools.

8. The vehicular system of claim 1, wherein at least one of the power source coupling devices is operable to be in a deployed configuration when coupled with a respective one of the power source modules, and in a stowed configuration when decoupled from the respective one of the power source modules.

9. The vehicular system of claim 8, wherein the deployed configuration is an unfolded configuration and the stowed configuration is a folded configuration.

10. The vehicular system of claim 1, further comprising a trailer device that is operably connected to the vehicle, wherein the recommended number of power source modules also depends on weight of the trailer device.

11. The vehicular system of claim 10, wherein the trailer device includes an additional plurality of power source modules to supply an additional amount of power to the vehicle that are operable to be readily attached to and removed from the trailer device.

12. The vehicular system of claim 10, wherein the trailer device includes at least one of a plurality of power source modules and/or at least one solar panel that supply an additional amount of power to the vehicle.

\* \* \* \* \*